(12) United States Patent
Gilbert

(10) Patent No.: US 7,707,703 B2
(45) Date of Patent: May 4, 2010

(54) FLEXIBLE COUPLINGS

(75) Inventor: Klay Ethan Gilbert, Lindsay, TX (US)

(73) Assignee: Weber Aircraft LLC, Gainesville, TX (US)

( * ) Notice: Subject to any disclaimer, the term of this patent is extended or adjusted under 35 U.S.C. 154(b) by 351 days.

(21) Appl. No.: 11/789,392

(22) Filed: Apr. 24, 2007

(65) Prior Publication Data

US 2007/0193015 A1   Aug. 23, 2007

Related U.S. Application Data

(63) Continuation of application No. 10/761,728, filed on Jan. 21, 2004, now Pat. No. 7,235,014.

(51) Int. Cl.
*B23P 11/00* (2006.01)

(52) U.S. Cl. ........................................... 29/434

(58) Field of Classification Search ............... 29/434, 29/428; 464/93, 138, 92, 137, 102; 244/122 R; 403/223, 224
See application file for complete search history.

(56) References Cited

U.S. PATENT DOCUMENTS

| | | | |
|---|---|---|---|
| 2,930,211 A | 3/1960 | Guy | |
| 3,543,538 A | 12/1970 | Farrell et al. | |
| 3,798,924 A | 3/1974 | Downey | |
| 4,318,281 A | 3/1982 | Cutler et al. | |
| 4,708,692 A | 11/1987 | Weiss | |
| 5,035,677 A | 7/1991 | Kanamaru et al. | |
| 5,295,912 A | 3/1994 | Muller et al. | |
| 5,692,705 A | 12/1997 | Bellais | |
| 6,325,722 B1 | 12/2001 | Ciotola | |
| 7,235,014 B2 | 6/2007 | Gilbert | |

FOREIGN PATENT DOCUMENTS

GB          580901          9/1946

OTHER PUBLICATIONS

Pages 1029-1034 of a McMaster-Carr catalog (undated; available to Applicant prior to Jan. 21, 2004).
One page brochure of Guardian Flexible Curved Jaw Couplings (dated Nov. 3, 2003.
Two pages of information concerning Big Boy couplings (dated Nov. 3 and 8, 2003).
Three pages of information concerning Superflex Super Elastic Couplings (dated Nov. 3, 2003).

*Primary Examiner*—John C Hong
(74) *Attorney, Agent, or Firm*—Dean W. Russell; Kristin M. Crall; Kilpatrick Stockton LLP

(57) ABSTRACT

Addressed are couplings for transferring rotational motion from one shaft to another. The couplings may include flexible components and may be designed to accommodate angular, axial, and parallel misalignments. Included as components of the couplings may be hub portions, each having dowel pins and clearance holes, and a center member positioned intermediate the hub portions.

8 Claims, 3 Drawing Sheets

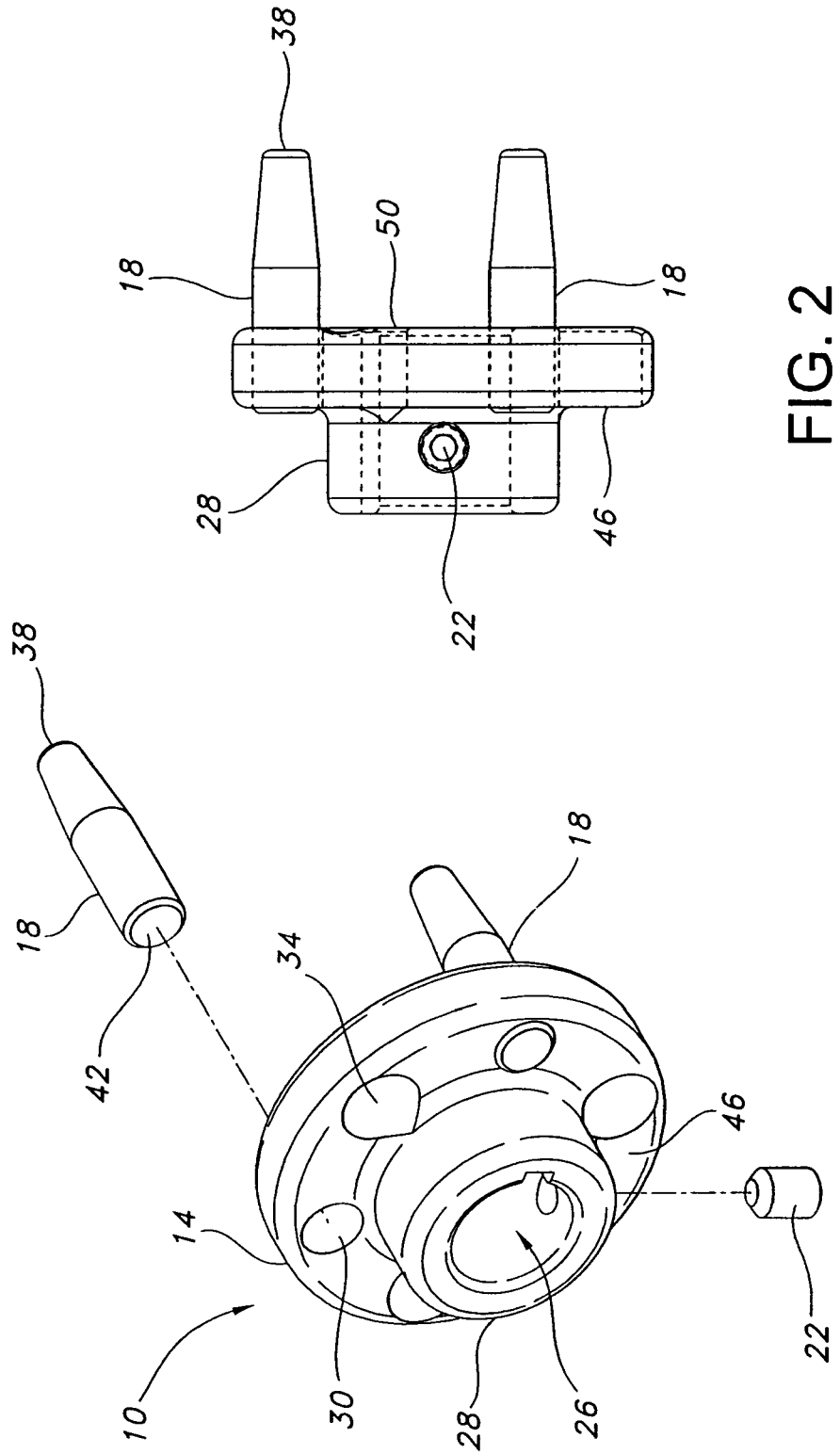

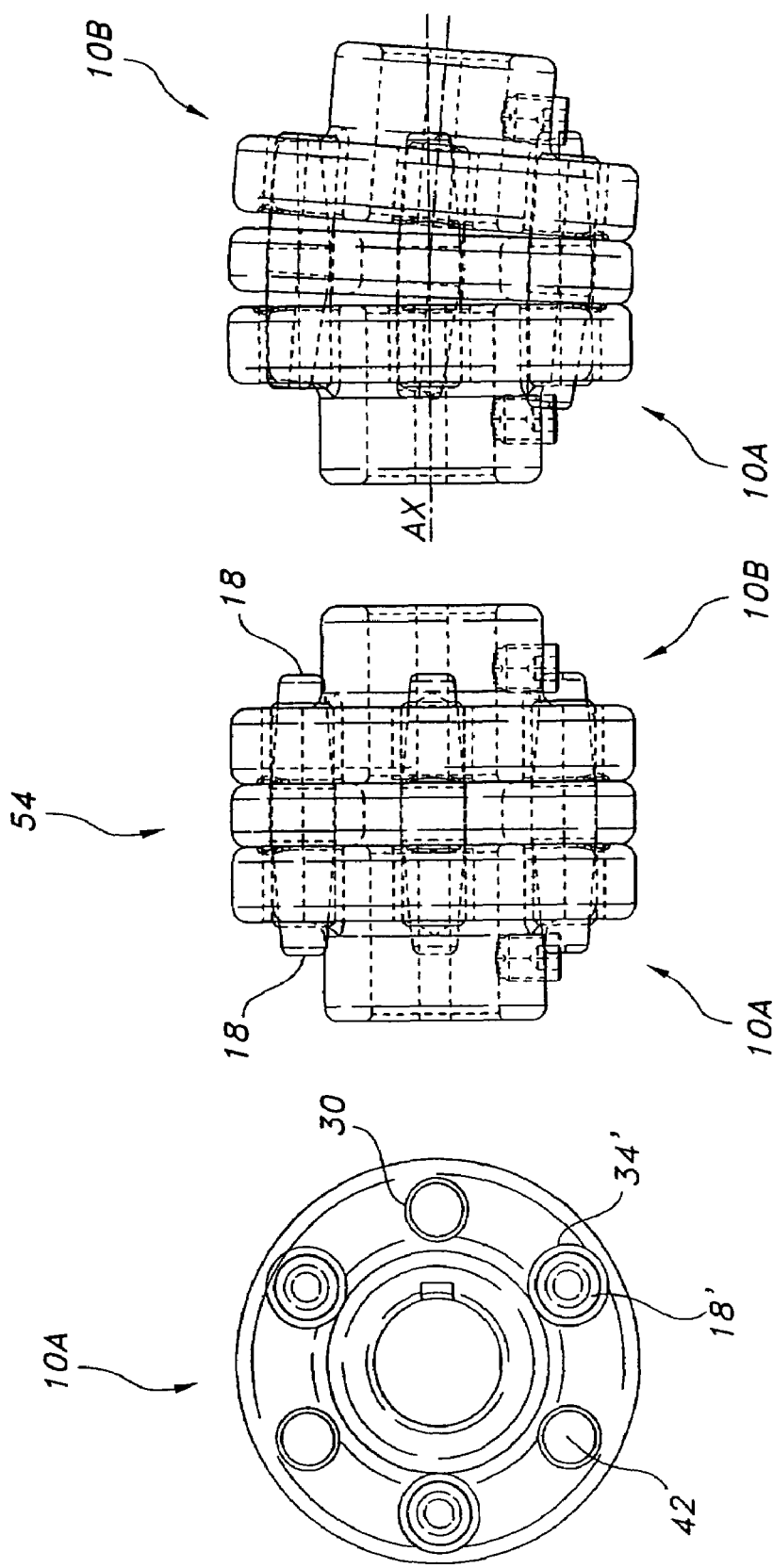

FLEXIBLE COUPLINGS

CROSS REFERENCE TO RELATED APPLICATION

This application is a continuation of U.S. patent application Ser. No. 10/761,728 filed on Jan. 21, 2004 now U.S. Pat. No. 7,235,014 entitled "Flexible Couplings," now allowed, the contents of which are incorporated by reference herein.

FIELD OF THE INVENTION

This invention relates to assemblies for transferring motion from one shaft to another and more specifically to couplings that are flexible or may, if desired, contain flexible components.

BACKGROUND OF THE INVENTION

Couplings conventionally are used to transfer motion from one machine shaft to another. Numerous issues are presented in designing a suitable coupling, with variables such as torque, speed, misalignment, dampening, backlash, cost, size, reliability, ease of maintenance, and ease of manufacture needing to be considered. Consequently, many couplings either are designed for particular purposes or function optimally only in certain circumstances.

At least some couplings are rigid, providing essentially no flexibility. Often cylindrical in shape, these couplings include openings on each end of the cylinder to receive shafts. Typically set screws are used to lock the received shafts into position, although some versions of rigid couplers employ alternative fasteners (such as square keys or woodruff keys). Regardless of fastening mechanism, though, these couplings tolerate essentially no shaft misalignment and cannot provide any dampening.

Other existing couplings are known as "spider" couplings. Also generally cylindrically shaped, these couplings include protruding members and utilize a cushion (the "spider") between cylindrical hubs. Although the machine shafts are locked in position relative to each hub (as they are in rigid couplings), employing a spider made of elastomeric material accommodates at least modest shaft misalignment and allows, potentially, for some dampening to occur. By contrast, possible failures of the protruding members under load or shock limit the functionality of these couplings.

Yet other couplings presently available are called helical beam couplings. Formed, basically, of tubes with helixes cut around the tube walls, these couplings nevertheless maintain rigid hub-shaft connections at their ends. Consequently, although they sometimes may admit some parallel misalignment, they typically permit no axial misalignment of shafts or dampening of the motion. Helical beam couplings further likely will not support high torque levels and are relatively expensive.

Another type of commercially-available coupling is the slotted-disc, or Oldham, coupling. In this device a hard slotted disc replaces the spider of the spider coupling, allowing the ends of the coupling to move independently of one another. Failures of the disc may occur, however, and no axial (and little angular) misalignment of shafts is permitted. Oldham couplings additionally permit only small amounts of dampening.

Pinhole-disc couplings (also known as Schmidt couplings) likewise are similar to spider couplings. However, rather than utilizing protruding members, pinhole-disc couplings employ dowel pins on half of the face of the coupling hub. Hubs are joined with special flexible discs that clock them at ninety degrees to each other. Again, though the (usually plastic) discs, or the dowel pins, may fail in use; additionally, no axial shaft misalignment is permitted and only limited dampening is available.

Bellows and gear-and-sleeve couplings provide further alternatives to the couplings heretofore described. Bellows couplings, with their accordion-style shapes, are highly flexible. They permit neither axial shaft misalignment nor dampening to occur, however, and because of their shape are relatively expensive to manufacture. Gear-and-sleeve couplings, by contrast, allow some dampening. Typically consisting of metallic hubs with external gear teeth that slide into tubular sleeves with complementary grooved teeth, these couplings are advantageous when significant axial misalignment is expected. However, they are relatively expensive to manufacture, require substantial maintenance, tend to vibrate at high speeds, and need lubrication on many metal sleeve designs.

Among other conventional couplings are double-loop ones, comprising two hubs with a flexible double loop of elastomeric material molded so as to provide an offset figure-eight to each hub. These couplings fail to permit dampening and are relatively expensive to manufacture; as well, because the elastomeric material is large, they require substantial space for operation. Tire couplings likewise comprise hubs (albeit large metallic ones) connected by an elastomeric "tire." Tire walls are clamped to the large hubs while smaller quick-disconnect bushings lock the hubs to the shafts on each end. Similar to the double-loop couplings, these tire couplings require significant space in which to operate and are expensive to produce. They further are heavier than most other couplings and do not support large torques.

Shear couplings attempt to protect over-driven shafts from damage. These couplings include two metallic cylindrical hubs, the ends of which receive the shafts, and a molded elastomeric member between them. Rather than supporting high-torque operation, the member contains a center section designed to fail when subjected to high torque so as to reduce the risk of the shaft doing so. Shear couplings also do not permit any axial misalignment of shafts and allow only low angular and parallel misalignments.

Multi-flex couplings, like many others, include two metallic hubs with a central elastomeric element. Each hub has a groove on its face that contains teeth, and the elastomeric element has integrally-formed teeth on its inner and outer sides at each of its ends. The teeth of the elastomeric element fit into each hub. Possibility of failure of the elastomeric elements remains an issue for these couplings, are does their limited ability to tolerate misaligned shafts.

Roller-chain couplings provide yet other alternative devices. Consisting of hubs with external gear teeth on an end, these couplings are joined y a roller chain set into the gear teeth so as to lock the hubs together. A cover wraps each set of hubs and chain to complete an assembly. Lubrication is required for the couplings, however, and misalignment tolerances are small. Failure of the chain, further, will result in the coupling being unable to transfer rotational motion.

Frontline Industries, Inc. of Irvington, N.J. advertises yet another coupling under the name "Big Boy." This coupling consists of a hub with a center hole to mount shafts and multiple bores positioned around the hub face. A center ring, containing twice as many holes as the number of hub bores, accepts threaded, bullet-shaped pins. Each assembly includes a hub, pins installed on each side of the hub, and a cylindrical rubber bushing placed over the pins, which are then inserted into the bores. Among disadvantages of the "Big Boy" coupling are that it appears to require close tolerances for operation and is expensive to manufacture. The coupling also could disengage if axial misalignment exists above a modest level.

Finally, also advertised as commercially available is the "Superflex Super Elastic Coupling." This coupling incorporates a flexible center section connected to two metallic hubs with through bolts positioned in an alternating pattern. It is large in size, however, and both expensive and designed for heavy industrial use.

SUMMARY OF THE INVENTION

The present invention provides alternatives to these and other existing couplings. Designed to accommodate substantial angular misalignment, medium speeds, and high torques, the couplings of the invention also permit simultaneous axial and parallel shaft misalignments. The couplings additionally are reliable, relatively inexpensive to manufacture, and do not require maintenance of close tolerances. They further may be small in size yet scalable if necessary to meet demand for larger sizes. Other beneficial characteristics of the couplings include maintenance of rotational motion transfer notwithstanding failures of portions of the couplings, relatively few parts, minimal backlash, good dampening qualities, no need for lubrication, and ability to withstand high shock force loads without failure.

Certain preferred embodiments of the invention include pairs of metallic hubs with multiple dowel-like pins and large, offset clearance holes. A center member, advantageously made of elastomeric material with multiple openings, may be fitted between the hubs. Dowel pins also may be pressed, threaded, or otherwise positioned into each hub. The pins preferably (although not necessarily) are tapered toward their free ends to provide additional angular clearance.

To assemble these couplings, a center member may be slid onto the pins of a hub. Thereafter, a second hub may be rotated sixty degrees so that the pins slip into the holes of the center member. Pins from one hub slip through the clearance holes of the opposing hub but do not touch the opposing hub during normal operation. Openings in each hub receive shafts, with fasteners such as (but not necessarily) key slots and set screws locking them in place.

This structure transmits rotational force through one shaft to a hub and dowel pins, then to the center member (in shear), to the opposing dowel pins in the opposing hub, and finally to the other shaft. In some embodiments, angular misalignment tolerance may be as great as ten degrees. Parallel misalignment may be tolerated as a function of clearance hole sizes, while axial misalignment is tolerated as a function of dowel pin length. If parallel misalignment is significant, the dowel pins will move diametrically around the clearance holes of the opposing hub as the coupling rotates. Should a pin fail, the remaining pins would enable the coupling to transmit rotational motion (assuming the loads are not so great as to cause the coupling itself to fail).

Various embodiments of the invention allow the center member to be made of either elastomeric or rigid material. Using elastomeric material to form the center member likely would improve torsional dampening characteristics of the couplings while increasing backlash. Employing rigid plastic or other material for the center member should result in decreased backlash but decreased dampening as well.

Embodiments of the invention also may permit removal and replacement of the center member. Similarly, they allow for use of dowel pins other than as described above. As an example, rather than tapering, the dowel pins may be headed to limit axial misalignment in certain circumstances.

It thus is an optional, non-exclusive object of the present invention to provide couplings for transferring rotational motion.

It also is an optional, non-exclusive object of the present invention to provide couplings adapted to accommodate angular, axial, and parallel shaft misalignments.

It is another optional, non-exclusive object of the present invention to provide couplings utilizing hub components having both pins and clearance holes.

It is an additional optional, non-exclusive object of the present invention to provide couplings utilizing a center member received by the pins.

It is a further optional, non-exclusive object of the present invention to provide couplings in which pins from one hub assembly slip through clearance holes of an opposing assembly.

Other objects, features, and advantages of the present invention will be apparent to those skilled in the relevant field with reference to the remaining text and the drawings of this application.

BRIEF DESCRIPTION OF THE DRAWINGS

FIG. 1 is an isometric, partially exploded view of a hub of the present invention.

FIG. 2 is a side view of the hub of FIG. 1.

FIG. 4 is an end view of the coupling of FIG. 3.

FIG. 5 is a side view of the coupling of FIG. 3.

FIG. 6 is another side view of the coupling of FIG. 3 illustrating tolerance of substantial angular shaft misalignment.

DETAILED DESCRIPTION

Figure 3:
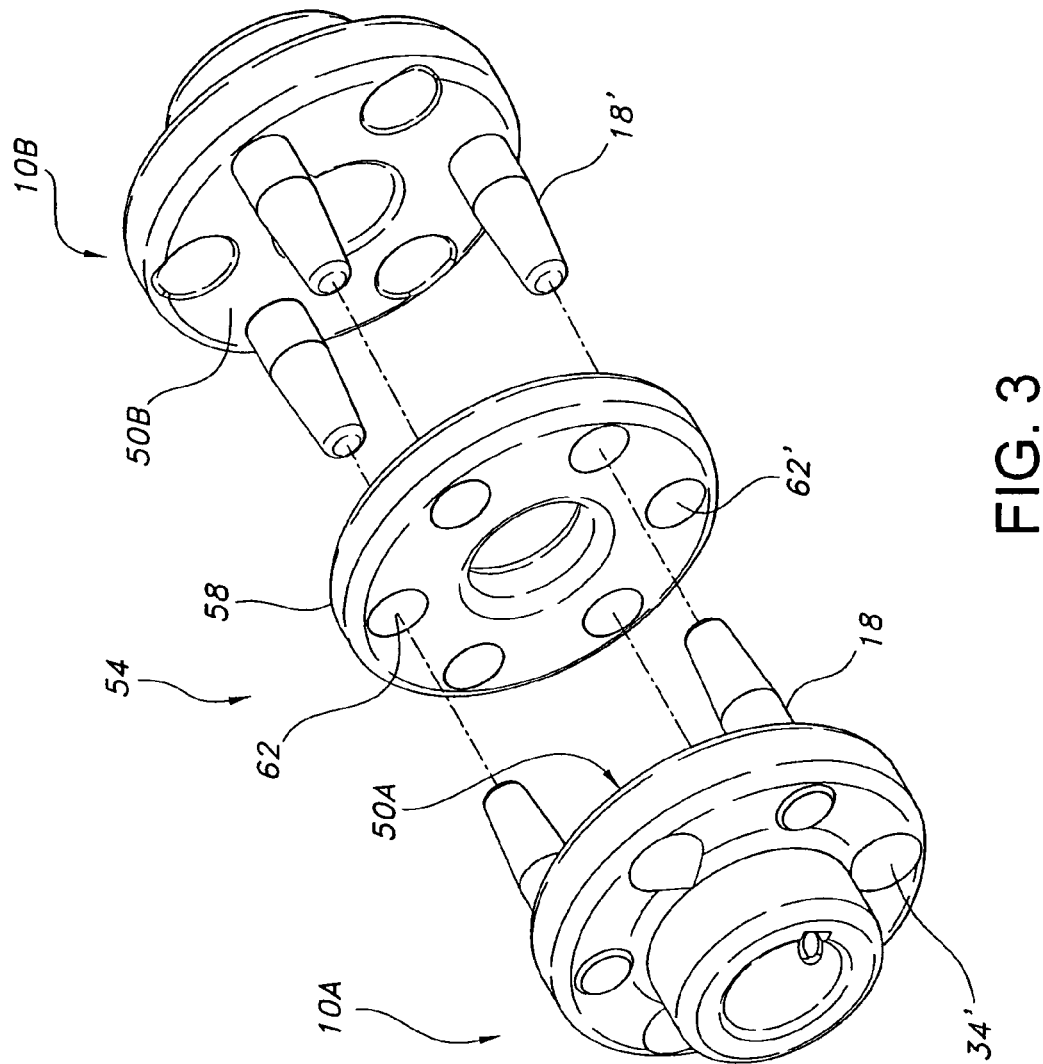
FIG. 3 is an isometric, partially exploded view of a coupling of the present invention utilizing hubs of FIG. 1.

Illustrated in FIGS. 1-2 is hub assembly 10. Assembly 10 comprises hub 14 and one or more pins 18. Also included as part of assembly 10 may be fastener 22, which is shown in FIGS. 1-2 as comprising a set screw. However, those skilled in the appropriate art understand that devices other than or in addition to a set screw may be utilized as fastener 22.

Depicted in hub 14 is bore 26, defined by collar 28 and designed to receive, in use, a rotating shaft. After such a shaft is received in bore 26, fastener 22 may be tightened to fix the position of the shaft relative to hub 14. One or more openings 30 in hub 14 receive pins 18. Pins 18 typically are pressed into openings 30 and maintained therein with a friction fit. They need not, however, be so pressed, but instead may be connected to hub 14 in any suitable way or integrally formed therewith.

Also illustrated in hub 14 are one or more clearance holes 34. Shown as interspersed radially with openings 30, clearance holes 34 are adapted to receive pins 30 from another hub 14. In the embodiment of hub 14 detailed in FIG. 1, three each of openings 30 and clearance holes 34 are present in the hub 14, with each hole 34 being offset radially from an adjacent opening 30 by sixty degrees. Fewer or greater numbers of openings 30 and clearance holes 34 may exist, however, if necessary or desirable.

Pins 18 are shown in FIGS. 1-2 as being generally in the form of dowels. Preferred versions of pins 18 are tapered adjacent their free ends 38. Fixed ends 42, by contrast, are configured for fitting into openings 30, preferably (although not necessarily) flush with outer face 46. As fitted, pins 18 protrude from inner face 50 of hub 14.

FIG. 3 illustrates, in exploded form, coupling 54. Coupling 54 typically comprises a pair of hub assemblies 10 (denominated 10A and 10B) together with center member 58. As constructed, center member 58 is positioned intermediate the hub assemblies 10 and received by both such assemblies 10A and 10B.

In particular, center member 58 includes a plurality of openings 62, at least one opening 62 for each pin 18 of each hub assembly 10. Thus, in the exemplary version of coupling 54 depicted in FIG. 3, center member 58 includes six openings 62, equaling the total number of pins 18 present in exemplary hub assemblies 10A and 10B. These six openings 62 are spaced radially about center member 58, with one present every sixty degrees. Again, however, fewer or greater numbers of openings 62, and different spacings, may be utilized instead.

In use, center member 58 is positioned between respective inner faces 50A and 50B of hub assemblies 10A and 10B. By appropriately rotating one hub assembly (10A or 10B), each pin 18 will align with and pass through an opening 62 of center member 58. Such rotation would equal sixty degrees in the exemplary coupling 54 of FIG. 3. Each opening 62 advantageously is only slightly larger than the diameter of its associated pin 18, although other size relationships could exist instead (particularly if pin 18 is not generally cylindrically shaped or opening 62 is non-circular).

After passing through a corresponding opening 62 of center member 58, each pin 18 is then received by a corresponding hole 34 of the associated hub assembly 10A or 10B. Stated differently, for a particular pin 18' of hub assembly 10B, the pin 18' passes first through opening 62' of center member 58 and then through hole 34' of hub assembly 10A. The result is depicted in FIGS. 5-6, which show pins having a length sufficient to be received by and extend substantially into a corresponding hole of the opposite hub. Generally, the diameter of hole 34 is substantially larger than the diameter of pin 18 so as to provide clearance therefore. If either pin 18 or hole 34 lacks circular cross-section, hole 34 preferably still will provide significant clearance for pin 18.

FIG. 6 illustrates the ability of coupling 54 to tolerate substantial angular misalignment of respective shafts. Because holes 34 are larger than ends 38 of pins 18, pins 18 are able to move some before abutting the boundaries defining holes 34. Shown in FIG. 6 is hub assembly 10B misaligned approximately five degrees from axis AX, although greater angular misalignments may also be tolerated. In instances in which substantial parallel misalignment exists, pins 18 will move diametrically within their corresponding clearance holes 34 as coupling 54 rotates.

Coupling 54 is designed to function satisfactorily at medium speeds and high torques and without lubrication. Hubs 14 preferably (but not necessarily) are made of metal; if so, the metal may be cast, forged, sintered, machined, or otherwise processed as appropriate. Center member 58 preferably is made of flexible material such as (but not limited to) plastics or natural or synthetic rubbers. Alternatively, center member 58 may be made of more rigid plastics or other materials. Center member 58 additionally may be removable if desired for repair, replacement, or otherwise.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention. Additionally, although coupling 54 is designed principally for use in aircraft seats with moveable components, it may be used in other seats (vehicular or otherwise) or for other purposes as appropriate or desired.

What is claimed is:

1. A method of accommodating angular and axial shaft misalignment while transferring rotational motion from one shaft to another comprising:
   a. providing a coupling comprising
      (i) first and second hub assemblies, each hub assembly comprising
         (A) means for receiving a shaft,
         (B) at least one pin, each pin having a tapered free end and a length sufficient to be received by and extend substantially into a corresponding hole in the other hub assembly, and
         (C) at least one hole for receiving a pin of the other hub assembly while providing clearance therefor, and
      (ii) a center member positioned between the first and second hub assemblies and comprising a plurality of openings for receiving the pins of each of the first and second hub assemblies; and
   b. rotating a received shaft, accommodating angular and axial misalignment with a shaft to which rotational motion is to be transferred by permitting movement of the pins within the holes in which they are received.

2. The method according to claim 1, wherein the plurality of openings in the center member are at least as great in number as the total number of pins comprising the first and second hub assemblies.

3. The method according to claim 1, wherein the center member is shaped as a circular disc and the plurality of openings therein are spaced radially in the disc.

4. The method according to claim 1, wherein at least some of the plurality of openings in the center member are sized smaller than the holes comprising each of the first and second hub assemblies.

5. The method according to claim 1, wherein the first hub assembly includes a plurality of pins and a plurality of holes interspersed radially with the plurality of pins.

6. The method according to claim 1, wherein each pin is generally cylindrically shaped and is tapered at an end remote from the hub assembly.

7. The method according to claim 1, wherein each pin defines an axis and in which the axis of the at least one pin of the first hub assembly is parallel to but not coincident with the axis of the at least one pin of the second hub assembly.

8. The method according to claim 7, wherein the first and second hub assembles comprise a plurality of pins having axes, and wherein the axes of the pins of the first hub assembly are offset radially approximately sixty degrees from the axes of the pins of the second hub assembly.

* * * * *